June 25, 1957     N. T. BALDANZA     2,797,180
METHOD OF MAKING ORNAMENTED BOWL-LIKE ARTICLE AND
ORNAMENTATION CARRIER THEREFOR
Filed July 12, 1955     2 Sheets-Sheet 2

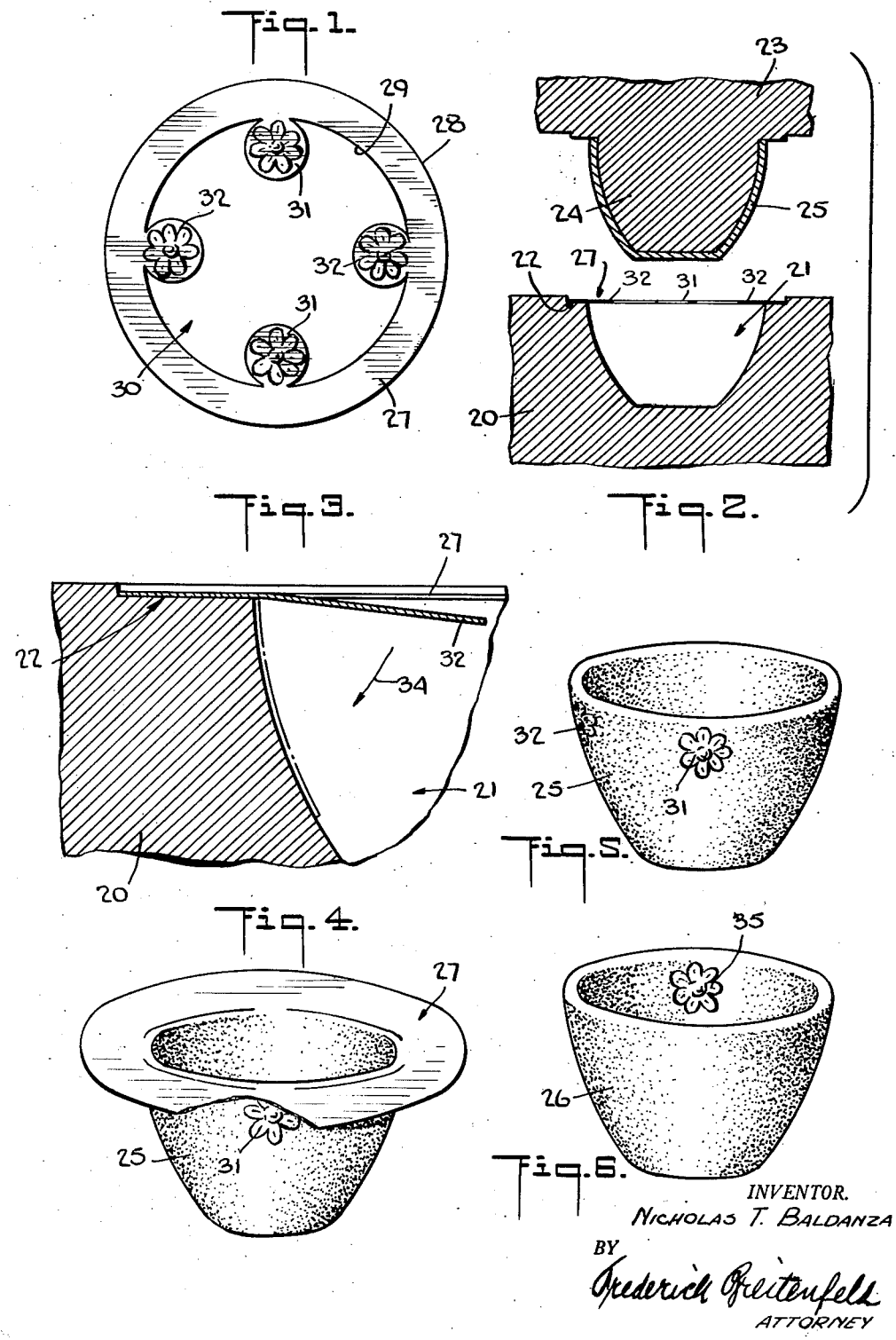

INVENTOR.
NICHOLAS T. BALDANZA
BY
Frederick Breitenfeld
ATTORNEY

United States Patent Office 2,797,180
Patented June 25, 1957

2,797,180

METHOD OF MAKING ORNAMENTED BOWL-LIKE ARTICLE, AND ORNAMENTATION CARRIER THEREFOR

Nicholas T. Baldanza, Rutherford, N. J., assignor to Fairhaven Properties Corp., a corporation of Delaware Application July 12, 1955, Serial No. 521,546

13 Claims. (Cl. 154—110)

This invention relates generally to ornamentation, and has particular reference to the ornamentation of the side surface of a molded bowl-like article having relatively steep sides.

In the art of applying ornamentation to an article of molded plastic in the shape of a relatively shallow dish, a tenchnique that has proved to be satisfactory in many respects is the one in which the desired ornamentation is first applied to a thin carrier or foil of paper or the like, and in which the carrier is subsequently integrated in its entirety with the article to be ornamented. An exemplification of this procedure is described and illustrated in United States Patent No. 2,646,380. The article to be ornamented is composed of a selected thermosetting molding material, and the molding process is temporarily discontinued before the curing of the material has been completed, to permit the introduction into the mold of the foil bearing the desired ornamentation. The foil is a flat sheet of thin absorbent material such as paper impregnated with a partially cured plastic material of the same type as that of the article. When the two parts of the mold are re-closed, the paper is bonded into an integrated relation to the article; the plastic material within the paper melts and merges with the plastic material of which the article is composed, and during the completion of the curing operation the ornamentation carrier and the article become inseparably bonded together. Preferably the paper is applied with the ornamented face down, and reliance is placed upon the circumstance that the paper becomes almost wholly transparent, hence invisible, during the curing and integration procedure.

One of the shortcomings of this process lies in the fact that commercial success depends upon the ability of the paper to become deformed out of its original plane without wrinkling or cracking. Where the article to be ornamented is rather shallow, as in the case of a dinner plate or saucer, the ductility of the ornamentation-carrying paper or foil can be made sufficiently high to prevent the undesired formation of creases or tears. However, attempts heretofore made to adapt this technique to the ornamentation of the relatively steep sides of cups or other bowl-like articles have not been successful.

It is a general object of this invention to obviate the problem referred to, and to provide certain improvements whereby the basic technique of integrating the ornamented carrier with the molded article can be employed successfully and on a commercially reliable scale to the ornamentation of the side surface or surfaces of a relatively deep bowl-like article.

One of the features of the improved technique resides in the provision of an ornamentation carrier of special shape, having an opening therein whose contour and dimensions substantially conform to the mouth of the article to be ornamented. In accordance with this invention, the carrier has at least one integral peninsular appendage extending radially inward from the edge of the opening and bearing the desired ornamentation. During the completion of the molding procedure, the ornamentation carrier is supported in a positional relationship in which the opening is in registry with the mouth of the article while the appendage is in a transverse position in overlying relation to the side surface to be ornamented.

The peninsular appendages are advantageously two or more in number, and symmetrically arranged in diametrically opposed relationship, as will be pointed out hereinafter.

In a simple embodiment of the invention, the carrier assumes the form of a ring or annulus. In the preferred mode of harnessing the features of the invention to the requirements of commercial practice, the carrier is a relatively large sheet having spaced areas each of which is intended for bodily incorporation with a bowl-like article, there being an opening in each of these areas, with one or more integral ornamental appendages. A sheet of this kind is intended for use in a multiple-cavity mold, the areas being so positioned that they cooperate with the mold cavities, respectively.

It is a special feature of the invention to provide a radially extending gap in communication with the opening in the ornamented carrier, positioned to compensate for the presence of a handle or similar lateral projection on the cup or other bowl-like article, whereby the advantages of the invention are readily capable of achievement even in connection with articles of that type.

The improved procedure is of a character that lends itself readily to the application of desired ornamentation either to the inside surface or the outside surface, or both surfaces, of the relatively steep side or sides of the molded article.

The manner of achieving the foregoing general objects and advantages, and such other objects and advantages as may hereinafter appear or be pointed out, is illustratively exemplified in the accompanying drawings, in which—

Figure 1 is a plan view of an ornamentation carrier or foil of the improved character;

Figure 2 is a diagrammatic representation of the cope and drag of a molding flask for a cup or similar bowl-like article, shown in the separated relationship of the parts during the temporary discontinuance of the molding process, showing also how the ornamentation carrier of Figure 1 may be located in association with the drag;

Figure 3 is a fragmentary view of the upper left part of the drag of Figure 2, on a greatly enlarged scale;

Figure 4 is a perspective view of the molded product produced as in Figure 2, before trimming;

Figure 5 is a view similar to Figure 4, showing the molded article in trimmed and completed condition;

Figure 6 is a view similar to Figure 5 showing a similar article ornamented on the inner surface;

Figure 7:
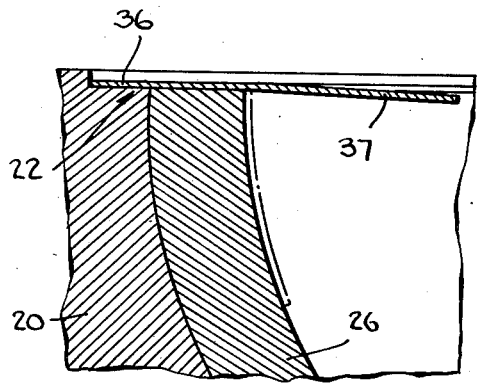
Figure 7 is a view similar to Figure 4 showing how the article of Figure 6 is produced.

In Figures 1–7 I have illustrated the applicability of the invention to the creation of a relatively simple bowl-like article of the type shown in either Figures 5 or 6, the article being substantially circular in horizontal cross section, the mouth having a diameter greater than that of the base, and the side wall being relatively steep and gently convex outwardly. By the term "relatively steep sides" as used herein and in the appended claims I intend to refer to an angularity (relative to the plane of the base of the article) appreciably greater than the relatively gentle curvature of a conventional dinner plate, saucer, or similar relatively shallow article.

In molding an article of the kind shown in Figures 5 and 6, a molding flask of the character shown in Figure 2 is employed. This flask has a drag 20 having a cavity 21 corresponding in contour and dimensions to the external surface of the bowl or cup. Extending peripherally around the mouth of the cavity 21 is a shallow shelf or depression 22. Cooperating with the drag 20 is a cope 23 having a generally convex part 24 conforming in contour and dimensions to the inside surfaces of the bowl or cup. In a manner known in the art, hence not depicted in the present drawings, the cope and drag of the molding flask are movable toward and away from each other, and appropriate means are provided for exerting the desired pressure, and applying the desired heat, if heat is required for the molding or curing of the article.

In accordance with known procedures and techniques, a predetermined charge of thermosetting molding material, usually in powdered form, is placed in the cavity 21. The two parts of the flask are then brought into cooperative proximity, and at a stage where the molded article 25 has become form-retaining, yet not completely cured, the flask is temporarily opened, as indicated in Figure 2. In the figure I have shown the partially completed article 25 adhering to the cope 23. This is the procedure that is followed where the desired ornamentation is to be integrated with the outer surface of the article. Where the ornamentation is to be incorporated with the inner surface (as in Figure 6) the partially completed article 26 (see Figure 7) is left within the cavity 21 during the temporary opening of the molding flask. In accordance with operative techniques that are known in the art, adherence of the article to the cope (Figure 2) or to the drag (Figure 7) can be controlled, usually by regulating the relative temperatures of the two parts of the mold flask.

At the stage of the process depicted in Figure 2, a special ornamentation carrier is supported in association with the article to be made. This carrier is shown by itself in Figure 1, and consists (in the illustrated embodiment of the invention) of an annulus 27 having an outer peripheral edge 28 and an inner edge 29 defining a central opening 30 concentric with the annulus 27. The opening 30 has a contour and dimensions substantially conforming to the mouth of the article to be ornamented.

Extending radially inward from the edge 29 of the opening 30, and bearing the desired ornamentation, is one or a series of peninsular appendages integral with the body of the carrier 27. In Figure 1 I have illustratively shown four such appendages, designated 31 and 32, each of substantially circular contour, the two appendages 31 being diametrically opposite each other, the appendages 32 lying between them and also in diametric opposition. The ornamentation carrier or foil is composed of suitable absorbent sheet material, usually a paper of high quality having a thickness of a few thousandths of an inch. The paper is impregnated with a molding material or resin, incompletely cured, of the same type as the thermosetting material of which the article itself is composed.

The ornamented impregnated carrier is now laid upon the shelf 22 of the drag 20, the shelf and the outer peripheral edge 28 of the carrier having conforming dimensions whereby the carrier is supported in a true concentric relation to the mouth of the cavity 21. At this stage the inherent heat of the molding flask usually starts to soften the impregnant within the carrier as a result of which the appendages start to sag downwardly in the direction of the arrow 34 (Figure 3), but whether or not the heat of the mold is relied upon to bring about this deflection of each appendage out of the initial plane of the carrier, the appendage ultimately reaches the position shown in dot-and-dash lines in Figure 3, the peripheral part of the carrier being firmly clamped between the cope and the drag of the flask, and the deflected appendage or appendages lying closely against the outer surface of the article 25. The molding and curing procedures are now brought to a conclusion, during which time the resinous material in the carrier melts and merges with the resinous material of which the article is composed. Upon completion of the molding, the flask is opened and the article withdrawn. Where the article has no peripheral flange of its own, the annular body of the carrier projects outwardly in the form of a fin, as indicated in Figure 4, but all other parts of the carrier have become embedded within and integrated with the molded article. Thus, the ornamentation carried by the appendage 31 appears at the correspondingly designated regions shown in Figures 4 and 5, the ornamentation carried by the appendage 32 appears in the position shown in Figure 5, etc. In each case the carrier material itself has become transparent and invisible, as a result of which it is only the ornamentation that manifests itself on the surface of the finished article.

Figure 8:
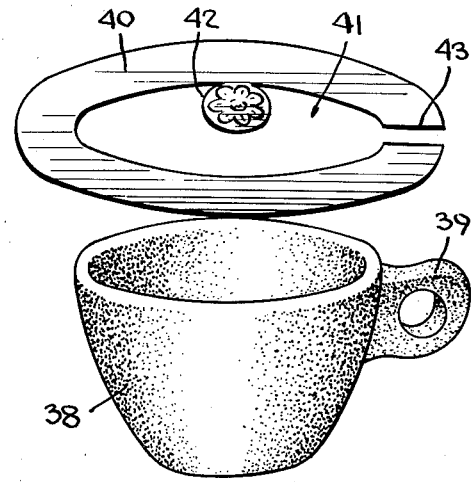
Figure 8 is an exploded view showing an ornamentation carrier having a gap therein, in association with the type of cup or similar article for which it is intended.
Figure 9:
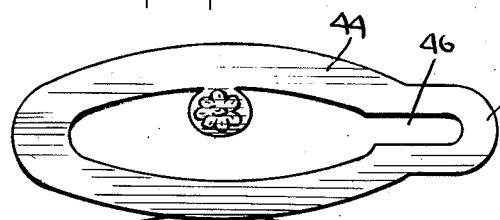
Figure 9 is a view similar to Figure 8 showing a modification.

The article is brought to a completed condition by trimming the fin shown in Figure 4, the ultimate appearance being shown in Figure 5.

Where the ornamentation is to be applied to the inner surface of the side wall of the article, as indicated at 35 in Figure 6, the procedure is the same except that the carrier 36 (Figure 7) is laid upon the shelf 22 of the drag 20 while the partially cured article 26 remains within the cavity 21. The reference numeral 37 designates an appendage of the character hereinbefore described, and the dot-and-dash lines of Figure 7 show the position assumed by this appendage during the completion of the curing operation. The appendage, it will be observed, is in a position closely overlying the inner surface of the side wall of the article, and during the completion of the molding process it becomes completely integrated with the article itself, the ultimate appearance of which is shown in Figure 6.

Where the process is to be practiced in connection with an article having a handle, such as the cup 38 shown in Figures 8 and 9, the ornamentation carrier is provided with a radial gap to compensate for the presence of the laterally projecting cup handle 39. One way of achieving the desired result is shown in Figure 8, another in Figure 9. In Figure 8 the ornamentation carrier has the general shape of an annulus 40, with a central opening 41 conforming in contour and dimensions with the mouth of the article, as hereinbefore described. The annulus 40 may carry an ornamented appendage of the character shown at 42. The modification depicted in Figure 8 resides in the provision of a radial gap 43 in the annulus 40, communicating with the opening 41 and lying in a position that corresponds to that of the cup handle 39. The provision of the gap 43 permits usual molding procedures to be followed, in connection with the formation of the handle 39, while at the same time the benefits of the present invention, involving the complete integration of the ornamentation carrier and its ornamented appendage or appendages with the molded article are capable of achievement.

Figure 11:
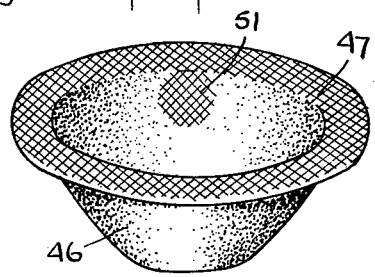
Figure 11 is a perspective view of a bowl-like article having a flange along its mouth, the flange bearing ornamentation.
Figure 12:
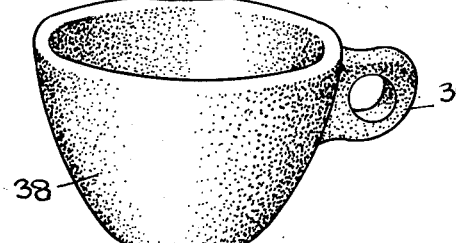
Figure 12 is a view similar to Figures 4 and 7, indicating the mode of producing an article such as that shown in Figure 11.

In Figure 9 the annulus 44 corresponds in general to that shown at 40 in Figure 8, except that in this case a U-shaped part 45 joins the opposed parts of the carrier on opposite sides of the gap 46. As in Figure 8, the gap 46 corresponds in size and position to the handle 39, and the employment of the ornamented carrier of Figure 9 permits the present improved ornamentation procedure to be practiced without interfering with the normal molding techniques relative to the creation of the handle 39 on the cup 38.

Where desired, the annular part of the ornamentation carrier may itself bear ornamentation for incorporation with the corresponding underlying part of the molded article. An example of this is indicated in Figures 11 and 12, in which I have shown a bowl-like article 46 provided at its mouth with an outwardly extending flange 47. In this case the drag 48 has a cavity correspondingly contoured as at 49 to result in the formation of the desired flange 47, and the annular part of the ornamentation carrier 50 becomes embedded within and completely integrated with the flange 47 during the course of the procedure as described in connection with Figures 1–7. For illustrative purposes I have shown an ornamented appendage 51 on the carrier 50, intended to be incorporated with the inner side surface of the bowl. By imparting an appropriate shape and dimensions to the ornamentation carrier, and laying it into position as shown in Figure 3 while the partially completed bowl is retained on the cope (as in Figure 2), the flange or other part of the side wall of the bowl may be ornamented on its exterior surface as will be readily understood.

Figure 10:
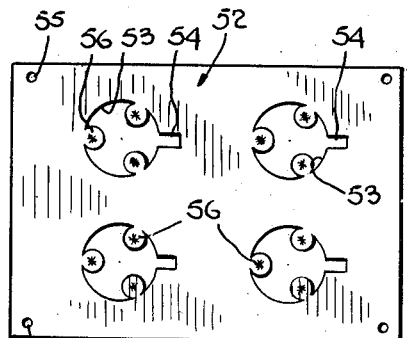
Figure 10 is a plan view, on a reduced scale, of an ornamentation carrier intended for use with a multiple-cavity molding flask or apparatus.

In Figure 10 I have illustrated the preferred form of ornamentation carrier, to be used in connection with a multiple-cavity mold. The carrier 52 chosen for illustration in Figure 10 is provided with four openings 53, each opening being arranged in an area intended to cooperate with mold flask parts of the general type indicated in Figure 2. For illustrative purposes I have shown a radial gap 54 in communication with each opening 53, each of these gaps corresponding to, and serving the same purpose as, the gaps designated 43 and 46 in Figures 8 and 9. The carrier sheet 52 may have any desired exterior contour, and I have shown a rectangular sheet with openings 55 near the corners to cooperate with locating pins carried by the mold apparatus. Thus a positioning of the carrier sheet 52 on these pins, during the temporary opening of the mold at the partially cured stage of the process, results in accurately positioning each of the openings 53, hence each of the ornamented appendages 56, in proper relationship to the article being molded in that particular location.

While I have shown ornamented appendages of circular shape, it will be understood that they may have varying contours, depending upon the nature of the ornamentation desired. Generally speaking, it is desirable that the appendages be arranged symmetrically with respect to the periphery of the opening into which they extend. In Figure 1, for example, the appendages are arranged at 90° intervals, whereas in Figure 10 they are arranged at 120° intervals. This has the advantage of balancing the pressures during the completion of the molding process, thereby achieving more uniform and more satisfactory results. Under certain circumstances, however, the appendages may be arranged in an asymmetrical manner, as exemplified by the single appendage shown in Figures 8 and 9.

In general it will be understood that many of the details herein described and illustrated may be modified by those skilled in the art without necessarily departing from the spirit and scope of the invention as expressed in the appended claims.

Having thus described my invention what I claim as new and desire to secure by Letters Patent is:

1. A method of applying ornamentation to a side surface of a bowl-like article having relatively steep sides, which consists in providing an ornamentation carrier of thin sheet material having an opening therein whose contour and dimensions substantially conform to the mouth of the article, said carrier having at least one integral peninsular appendage extending radially inward from the edge of said opening and bearing the ornamentation desired, supporting the carrier in a positional relationship in which said opening is in registry with the mouth of the article and said appendage is in a transverse position in overlying relation to the side surface to be ornamented, and integrating the ornamented appendage with said side surface.

2. A method of ornamentation as defined in claim 1, in which said integration is effected by molding the article of a thermosetting molding material to an incompletely cured state, preliminarily impregnating the carrier with the same type of moldable material and completing the cure while the carrier is supported in said registering positional relationship with the mouth of the article.

3. A method of ornamentation as defined in claim 1, in which said integration is effected by molding the article of a thermosetting molding material, preliminarily impregnating the carrier with the same type of moldable material, temporarily discontinuing the molding process and opening the mold at a stage at which the article is form-retaining but incompletely cured, introducing the carrier into the opened mold, re-closing the mold to clamp said carrier into said registering positional relationship with the mouth of the article, and then completing the curing process.

4. A method of ornamentation as defined in claim 1, in which the integration of the appendage with the side surface of the article is accompanied by a simultaneous integration of at least another part of said carrier with the adjacent part of the article.

5. A method of ornamentation as defined in claim 1, in which the appendage lies against and is integrated with the inner surface of the article.

6. A method of ornamentation as defined in claim 1, in which the appendage lies against and is integrated with the outer surface of the article.

7. A method of applying ornamentation to a side surface of a bowl-like molded resinous article having relatively steep sides, which consists in providing an ornamentation carrier of absorbent sheet material impregnated with uncured resin of the type of which said molded article is composed, said carrier having an opening therein of a contour and dimensions substantially like those of the mouth of the article, said carrier having at least one integral appendage extending radially inward from the edge of said opening and bearing the ornamentation desired, molding the article to a form-retaining but incompletely cured state, then supporting the carrier in a position in which said opening is in registry with the mouth of the article and in which said appendage is in a transverse position in overlying relation to the side surface to be ornamented, and while the carrier is thus supported, subjecting the article and carrier to the heat and pressure required to merge the resin in the carrier with the resin of the article and to complete the curing of both with resultant integration of the ornamented appendage with the side surface of the article.

8. A method of molding a bowl-like article of thermosetting molding material and having relatively steep sides with integrated ornamentation thereon, which consists in providing a mold flask of appropriate shape comprising a substantially concave drag and a complementary substantially convex cope, providing an ornamentation carrier of absorbent sheet material impregnated with uncured molding material of the same type as that of which the article is to be composed, said carrier having an opening whose contour and dimensions substantially conform to the mouth of the article, said carrier having at least one integral appendage extending radially inward from the edge of said opening and bearing the ornamentation desired, molding the article in said flask to an incompletely cured state and then temporarily opening the flask, applying said carrier to said drag in registry with the mouth thereof, re-closing the flask so that said carrier is clamped between the cope and drag while said appendage is constrained to assume a position in overlying relation to a side surface of the article, and then completing the molding process whereby the molding material in the carrier merges with the molding material of the article and thereby integrates said carrier with said article.

9. The method defined in claim 8, the partially-cured article being retained in said drag as the carrier is applied thereto during the temporary opening of the flask, whereby the ornamentation-carrying appendage overlies the inner surface of the article when the flask is re-closed.

10. The method defined in claim 8, the partially-cured article being retained on said cope during the temporary opening of the flask, whereby the ornamentation-carrying appendage overlies the outer surface of the article when the flask is re-closed.

11. The method defined in claim 8, there being a plurality of said appendages on said carrier, arranged symmetrically around the periphery of said opening.

12. As an article of manufacture, an ornamentation carrier intended for bodily incorporation with a bowl-like article having relatively steep sides, comprising a sheet of thin absorbent material having an opening substantially comforming in contour and dimension to the mouth of the article, and at least one integral appendage extending radially inward from the edge of said opening and carrying at least some of the desired ornamentation, said sheet being applicable to the article with said opening in registry with said mouth, and said appendage being deflectable out of the plane of said sheet into a transverse disposition in close overlying relation to a side surface of the article.

13. As an article of manufacture, an ornamentation carrier intended for bodily incorporation with a bowl-like article having relatively steep sides and molded of a thermosetting material, comprising a sheet of thin absorbent material having an opening substantially conforming in contour and dimensions to the mouth of the article, and at least one integral appendage extending radially inward from the edge of said opening and carrying at least some of the desired ornamentation, said sheet being applicable to the article with said opening in registry with said mouth, and said appendage being deflectable out of the plane of said sheet into a transverse disposition in close overlying relation to a side surface of the article, said sheet being impregnated with a moldable material of the same type as that of which the article is composed, so that a melting of said materials will cause a merger thereof and a rehardening will produce a consequent integration of the carrier with the underlying parts of the article.

14. An ornamentation carrier as set forth in claim 12, said sheet having a radially extending gap in communication with such opening.

15. An ornamentation carrier as set forth in claim 12, the area of said sheet around said opening being of annular shape.

16. An ornamentation carrier as set forth in claim 12, the area of said sheet around said opening being of annular shape, said annulus having a radially extending gap therein.

17. As an article of manufacture, an ornamentation carrier comprising a sheet of thin absorbent material having spaced areas each of which is intended for bodily incorporation with a bowlike article having relatively steep sides, each of said areas having an opening substantially conforming in contour and dimensions to the mouth of the article with which said area is to be incorporated, and at least one integral appendage at each of said areas extending radially inward from the edge of the opening in said area, said appendage carrying at least some of the desired ornamentation, said sheet being supportable in a position in which each opening is in registry with a corresponding article mouth, each appendage being deflectable out of the plane of said sheet into a transverse disposition in close overlying relation to a side surface of said article.

18. An ornamentation carrying sheet as set forth in claim 17, there being a radially extending gap adjacent to each opening and in communication therewith.

References Cited in the file of this patent

UNITED STATES PATENTS

| | | |
|---|---|---|
| 404,785 | Gibson | June 4, 1889 |
| 1,762,082 | Shiraishi | June 3, 1930 |
| 2,094,886 | Hart | Oct. 5, 1937 |
| 2,419,918 | Sheetz | Apr. 29, 1947 |
| 2,463,370 | Flaster | Mar. 1, 1949 |
| 2,523,234 | Rado | Sept. 19, 1950 |
| 2,559,756 | Buck | July 10, 1951 |
| 2,646,380 | Barlow et al. | July 21, 1953 |